United States Patent [19]

Mulach et al.

[11] Patent Number: 4,494,030

[45] Date of Patent: Jan. 15, 1985

[54] APPARATUS FOR PREVENTING OVERFLUX DAMAGE TO STATOR CORES

[75] Inventors: Arthur Mulach, Delmont; Raymond Calfo, Braddock Hills, both of Pa.

[73] Assignee: Westinghouse Electric Corp., Pittsburgh, Pa.

[21] Appl. No.: 318,231

[22] Filed: Nov. 4, 1981

[51] Int. Cl.³ .............................................. H02K 1/12
[52] U.S. Cl. ................................... 310/256; 310/217
[58] Field of Search ............... 310/256, 260, 270, 216, 310/217, 259, 258

[56] References Cited

U.S. PATENT DOCUMENTS

| | | | |
|---|---|---|---|
| 2,406,045 | 8/1946 | Stevens | 310/217 X |
| 2,795,714 | 6/1957 | Baudry | 310/256 |
| 3,693,035 | 9/1972 | Ostwald | 310/217 X |
| 4,227,109 | 10/1980 | Mulach | 310/217 X |

*Primary Examiner*—Donovan F. Duggan
*Attorney, Agent, or Firm*—William D. Lanyi

[57] ABSTRACT

A means for preventing harmful interlaminar electrical currents from flowing within the stator core of dynamo-electric machines is disclosed. By providing an insulation between the building bolts and the step iron portion of the stator core, current flow is inhibited in the event that a portion of the stator core is electrically shorted between adjacent laminations. Electrical communication between the building bolt and the stator core laminations is prevented by an insulated cylinder disposed about the building bolt and cooperatively associated with two layers of plates which are disposed on the two axial extremes of a preselected segment of the stator core laminations.

3 Claims, 6 Drawing Figures

APPARATUS FOR PREVENTING OVERFLUX DAMAGE TO STATOR CORES

BACKGROUND AND SUMMARY OF THE INVENTION

The present invention relates to the protection of stator cores from overflux damage and, more particularly, to the prevention of harmful interlaminar currents within the laminations of stator cores of dynamoelectric machines.

Typically, the stator cores of electrical generators are constructed with a multiplicity of punched laminations stacked to form a cylindrical core with a central bore therethrough. The inside diameter of the cylindrical core has a plurality of axially extending slots which are formed by stacking the laminations with their prepunched teeth aligned in a predetermined manner. The prepunched laminations are made from thinly rolled stock and are coated with a generally nonconductive inorganic surface. The two planar surfaces of each punching are arranged to be perpendicular to the central axis of the cylindrical stator core.

During operation, lines of magnetic flux run generally from one pole of the generator rotor radially outward into the stator core, circumferentially through a portion of the stator core and then radially inward to another pole of the rotor. As the rotor revolves, the above-described flux path rotates and induces an alternating electrical current in the stator coils which are disposed within the axially extending stator core slots described above.

However, near the two axial ends of the stator core, the lines of flux do not behave exactly as described above but, instead, tend to fringe axially outward from the two ends of the rotor field winding and reenter the stator core at right angles to the planar surfaces of the laminations at each axial end of the stator core. To protect the laminated punchings from damage that may be caused by this axially impinging flux, generator stators are generally protected by a stator end shield which consists of stepped laminations into which the fringing flux lines can be contained and provided with a circumferential path around the stator. Under normal conditions, the end-shield prevents these lines of flux from entering the stator core.

This end shield does not, however, provide complete protection during overvoltage or overflux conditions. Here, the laminated punchings located at the end of the main body of the stator core are subjected to lines of flux which pass through them in a direction which is perpendicular to their major planes. This flux induces intralaminar current paths which are most severe in the tooth region of the laminations which is located at the inside diameter of the stator core, closest to the rotor field winding. During this type of overflux operation, the intralaminar currents can cause overheating of the laminations' teeth or result in interlaminar faults. These faults can aggravate the above-described conditions and result in the tooth region of several axially adjacent laminations being electrically shorted together.

When this shorting occurs, a potential electrical path is created along a stator slot in the axial direction. Of course, the laminations are also electrically conductive within themselves. Since stator cores are typically built with conductive building bolts that run axially along the core's outside surface, a complete electrical current is created when the inside edges of two or more laminations are shorted. Following the creation of this type of short, the normal flux lines which run circumferentially around the core induce currents which can then travel axially along the short, radially outward through a lamination, axially along the building bolt and radially inward through another lamination, returning to the shorted region.

It should be apparent to one skilled in the art that, once these shorted circuits are created, normal operating flux which runs circumferentially around the core will aggravate the shorted condition and progressively produce severe damage to the stator core and ultimately require an expensive shutdown and repair of the electrical generator.

The present invention prevents this type of severe overflux damage by eliminating one leg of the above-described harmful current path. Specifically, an insulative cylinder is disposed about the building bolt in the region where these currents are most likely to arise. This prevents electrical communication between the building bolt and the laminations and thus, even in the event of shorted laminations in the tooth region of the laminations, no return path through the building bolt is available in which the damaging current can flow. In order to maintain the axial position of this insulative cylinder, two additional layers of non-magnetic plates are disposed within the laminated core, one on each axial end of this region of the core most likely to experience the axially impinging lines of flux. These plates are thicker than the laminations and are shaped to receive the insulative cylinder. The plates and the punchings therebetween are cooperatively associated to permit the stator core to be axially compressed without deforming the insulative cylinder.

It should be apparent that the present invention provides a means to minimize core damage caused by overflux conditions, to which electrical generators are occasionally subjected, by preventing the flow of harmful currents through the stator core.

BRIEF DESCRIPTION OF THE DRAWINGS

The present invention will be more fully understood from the following description of the preferred embodiment read in conjunction with the figures, in which.

DESCRIPTION OF THE PREFERRED EMBODIMENT

The present invention relates to an overflux protection system for the stator cores of dynamoelectric machines and, more specifically, to a means for preventing harmful current paths from being created by shorted core laminations.

Figure 1:
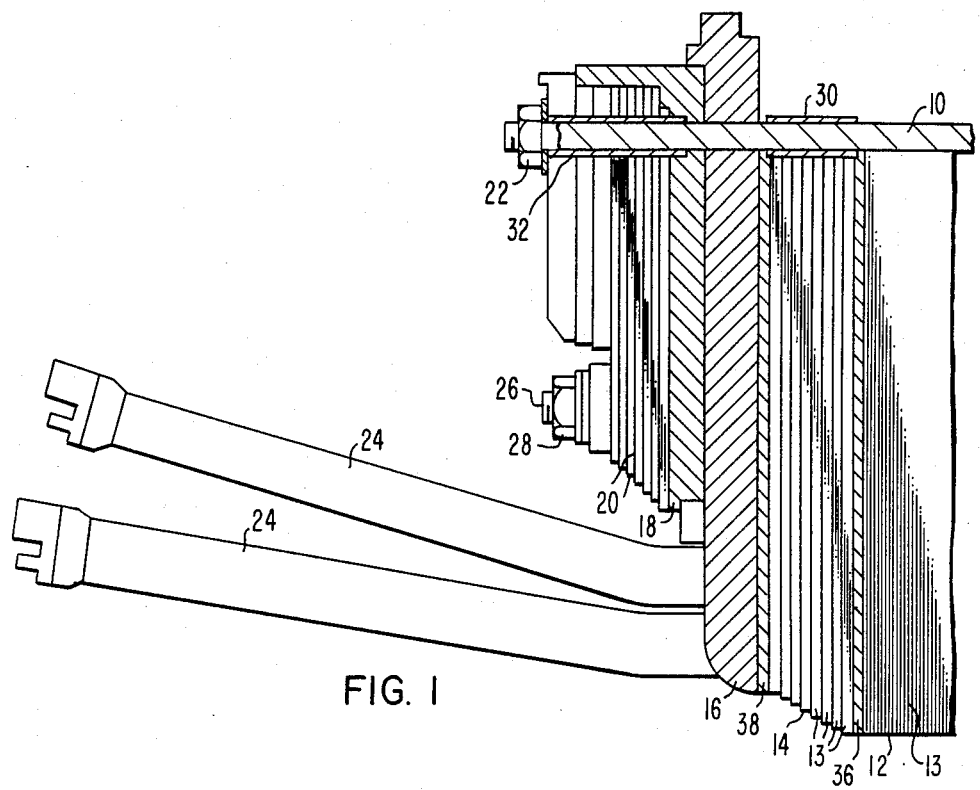
FIG. 1 shows a sectional view of a stator of an electrical generator comprising the present invention.

FIG. 1 shows a typical end section of an electrical generator's stator structure. This figure is a section view taken through one of a plurality of building bolts 10 which are used to construct the stator core 12 which in turn comprises a multiplicity of punched laminations 13. Disposed axially outward from the main body of the core 12 are stepped laminations referred to herein as step-iron 14. Outward from the step-iron 14 is the finger plate 16, the end plate 18 and the end shield 20. A building bolt 10 passes through these members and, in conjunction with a building bolt nut 22, provides an axial force that maintains tightness of the above-mentioned members along with the laminations 13 of the main stator core 12. The inside diameter of the cylindrically shaped stator core 12 is equipped with axially running slots (not shown in FIG. 1) in which the stator coils 24 are placed. These slots are the result of the precise alignment of teeth which are prepunched into each of the multiplicity of stator core laminations 13 used to construct the core 12.

Also running through the core 12, step iron 14, finger plate 16, end plate 18 and end shield 20 are a plurality of through-bolts 26 which, in conjunction with a through-bolt nut 28, also provide axial tightness of the stator core assembly. The through-bolts 26 and building bolts 10, which both run axially within the stator structure, can be distinguished from each other in three ways. The through-bolts 26 pass through circular holes in the other stator members with which they are associated, are positioned between the inside and outside diameters of the stator core 12 and are insulated from the members through which they pass. The building bolts 10, in contrast, are disposed within partially circular indentations in the core laminations 13, are disposed along the outside diameter of the stator core 12 and, in typical applications, are in electrical communication with the laminations 13 of the stator core 12 and step-iron 14.

The electrical communication between the building bolt 10 and the laminations 13 is altered in the present invention by the inclusion of an insulative cylinder 30 around the building bolt 10 in the region of the step iron 14. It should be noted that another insulative cylinder 32 is typically disposed about the building bolt 10 in the region where it passes through the end shield 20 in order to prevent electrical communication between the building bolt 10 and the end shield 20.

The present invention is facilitated in application by the inclusion of a first 36 and second 38 layer of plates on the axial ends of the step iron 14 which is electrically insulated from the building bolt 10 by the insulative cylinder 30. The primary purpose of these plates, 36 and 38, is to permit axial movement of the insulative cylinder 30 along the building bolt 10 during assembly so that axial compression of the core does not crush the cylinder 30.

In electrical generators, the function of the end shield 20 is to protect the core structure from the effect of axially impinging lines of flux which tend to fringe in the end regions of the core structure. As described above, the lines of flux normally pass from the poles of the rotor's field winding radially into and out of the stator core. Between rotor poles, the flux lines pass circumferentially through the laminations 13. In the axially outboard regions where fringing occurs, however, the axially impinging lines of flux induce intralaminar currents which can cause heating of the individual laminations 12 and possible create interlaminar electrical shorts. Under normal operating conditions, the end-shield 20 protects the core from being subjected to these lines of flux but, during overvoltage conditions, the end shield 20 provides only partial protection and the stator core laminations 13 are subjected to axial flux and the intralaminar current which it induces.

Figure 2:
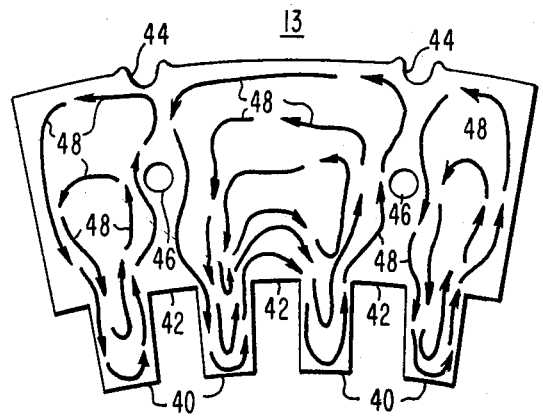
FIG. 2 is an illustration of a single core lamination showing the intralaminar currents that are induced by lines of flux which impinge the lamination perpendicularly to its planar surfaces.

FIG. 2 illustrates a single prepunched lamination 13 with its prepunched teeth 40 and slots 42. The figure also illustrates the typical partially circular holes 44 in which the building bolts will be disposed along with the circular holes 46 through which the throughbolts will pass. When the axially impinging lines of flux pass through a lamination 13, perpendicular to the planar surfaces of the lamination 13, intralaminar currents 48 are induced. It should be noted that, although the entire lamination 13 is subjected to these axial flux lines, the most severe currents flow in the tooth 40 and slot 42 region because of its closer proximity to the rotor field coils. Therefore, it is in this tooth region where the highest susceptibility to overheating and resultant damage occurs. The overheating, when severe overflux conditions exist, can cause interlaminar electrical shorts in the tooth regions, especially in the slot area 42 where the edges of adjacent laminations of a stator core abut each other.

Figure 3:
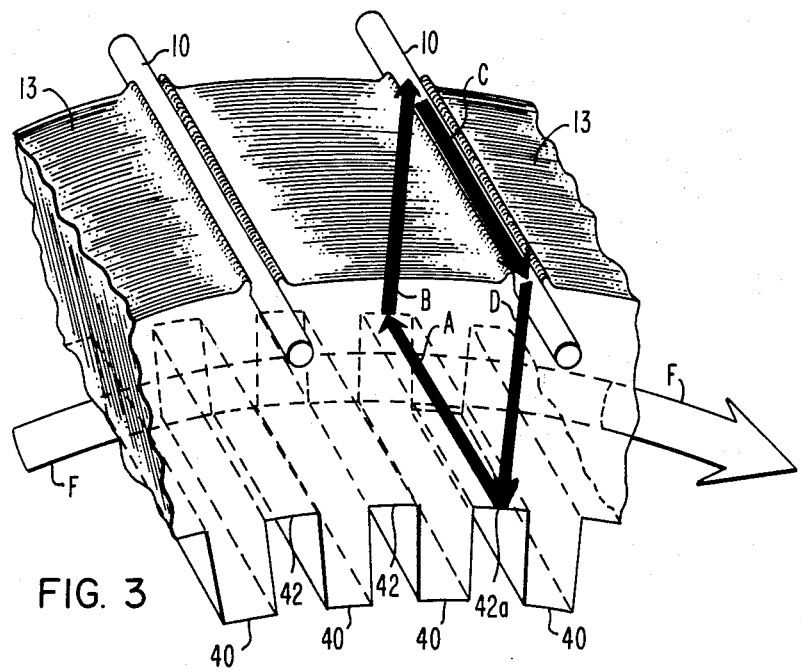
FIG. 3 depicts the interlaminar circulating currents that can flow within a region of a stator core in which interlaminar electrical shorts exist.

FIG. 3 illustrates the manner in which the above-described electrical shorts in the slot area 42 of the laminations can result in deleterious currents which will be induced to flow by the flux lines encountered during normal operating conditions even following the cessation of the overflux condition, referred to above, which created the interlaminar electrical shorts. FIG. 3 depicts a segment of the stator core located in the step-iron region of the stator (reference numeral 14 in FIG. 1). If an interlaminar short exists in the slot root area 42a, an electrically conductive path A is created which will permit a current to flow along the axial slot of the stator core. Arrow F illustrates an exemplary direction of the lines of flux which pass through the core during normal operating conditions. This flux F induces a current to flow along the path shown by arrows A, B, C and D. This current flows between the edges of the electrically shorted laminations 13 in the root area 42a for a distance equivalent to the length of the shorted region and then passes radially outward, in the direction of arrow B, until it reaches the building bolt 10 at the outside edge of the laminations 13. Since the building bolt 10 is conventionally in electrical communication with the laminations 13, the current can then pass axially through it, shown by arrow C, until it again travels radially inward to return to the shorted region along the path designated by arrow D.

It should be understood that, since each lamination 13 is normally coated with an inorganic insulative material, there would normally be no current path between the laminations 13 in the root area 42 without the existence of the above-described electrical shorts. In other words, leg A of the A-B-C-D current path would be absent and no current would flow. However, it should be apparent to one skilled in the art that, when such electrical shorting does exist, this harmful current can and does circulate as shown in FIG. 3 and can aggravate the shorted condition, causing severe damage to the stator core.

The present invention prevents the flow of this current, even if interlaminar shorting exists in the stator core, by eliminating the part of the electrical path designated by arrow C. With no electrical communication between the building bolt 10 and the laminations 13 in the region of the step iron, the current path A-B-C-D cannot exist and the harmful effects of interlaminar shorting are minimized.

Figure 4:
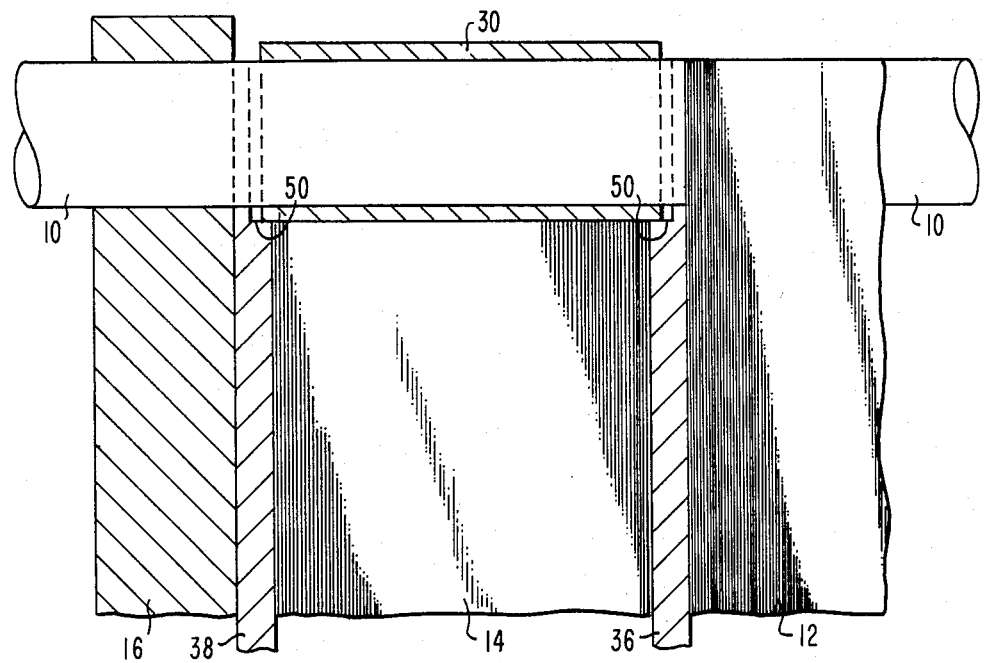
FIG. 4 is a sectional view showing the present invention in greater detail than in FIG. 1.

FIG. 4 illustrates the insulative cylinder 30, the first layer of plates 36 and the second layer of plates 38 of the present invention in greater detail than shown in FIG. 1. As shown in FIG. 4, the building bolt 10 passes through the finger plate 16, step-iron 14 and the main body of the stator core 12. In the region of the step-iron 14 portion of the laminated stator core, an insulative cylinder 30 is disposed around the building bolt 10 and prevents electrical communication between the building bolt 10 and the laminations of the step-iron 14 region. The plates, 36 and 38, of the present invention are shaped to receive the insulative cylinder. These plates have steps 50 machined around the partially circular holes which are located along their outer edge. These holes are similar to the holes in the laminations (reference numeral 44 in FIG. 2) but with the step 50 machined therein. In order to facilitate the inclusion of the step, it should be noted that the plates, 36 and 38, are thicker in the axial direction than the laminations. As can be seen in FIG. 4, the steps 50 are positioned to receive the insulative cylinder 30 and maintain its axial position by limiting its movement along the building bolt 10 to that motion required to prevent damage to the cylinder 30 during compression of the core during assembly.

Figure 5:
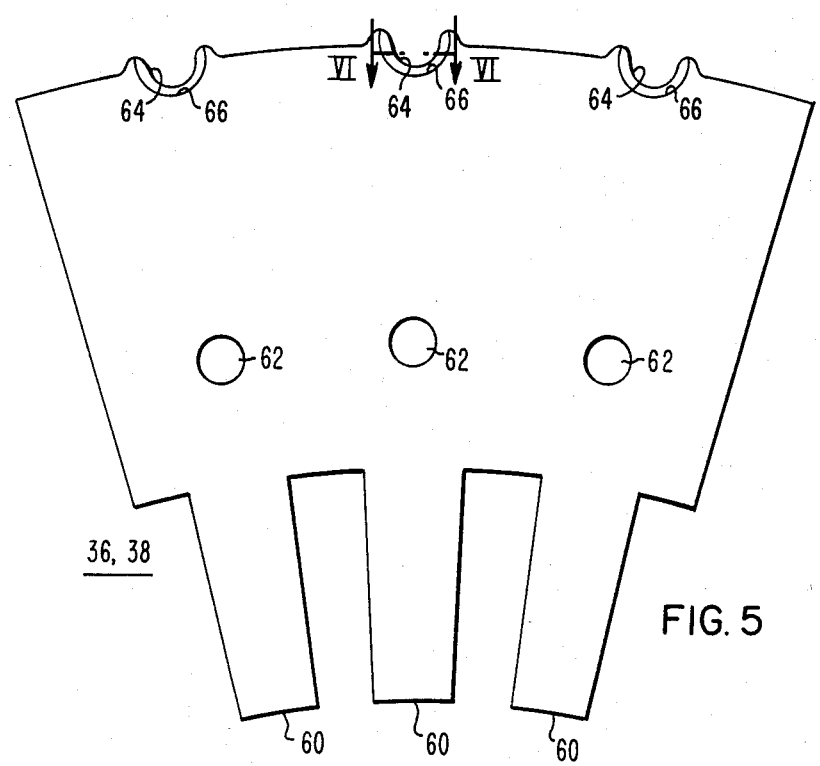
FIG. 5 shows the plate of the present invention.

FIG. 5 shows the planar surface of the plates, 36 and 38, which are essentially identical to each other. These non-magnetic plates are shaped similarly to the core laminations, having teeth 60 and holes 62 for the throughbolts to pass through. These plates, 36 and 38, can be made of any suitable non-magnetic material, such as stainless steel. The partially circular holes 64 in which the building bolts are disposed are essentially dimensionally identical to those of the laminations (reference numeral 44 of FIG. 2). Around each of these building bolt holes 64, a recess 66 is machined partially through the thickness of the plate. The effective diameter of this recess must be sufficient to allow the outside diameter of the insulative cylinder (reference numeral 30 in FIGS. 1 and 4) to pass into the recessed area created by this machining process. It has been found that a plate which is approximately one-quarter inch thick performs the intended function of restraining the insulative cylinder, but it should be understood that other thicknesses are equally operable. It should also be understood that the holes in the outer edges of the step-iron laminations must be correspondingly sized to allow passage of the insulative cylinder therethrough. The plates, 36 and 38, can additionally have radially extending slots or axial holes therethrough to facilitate the flow of cooling gas through the core, but this is not a requirement to the operation of the present invention.

Figure 6:
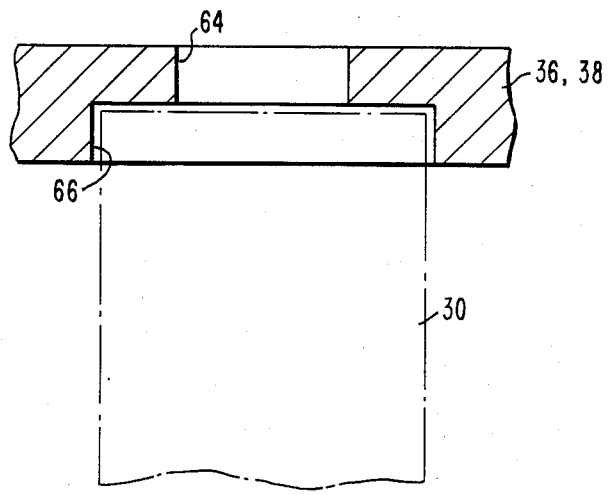
FIG. 6 is a sectional view of the plate of FIG. 5, along with an insulative cylinder of the present invention.

FIG. 6 is a section view of one of the building bolt holes of the plate of FIG. 5, also including an insulative cylinder 30 disposed therein. As is apparent in FIG. 6, the building bolt hole 64 is sized to allow passage of the uninsulated building bolt therethrough, whereas the recess 66 is sized to allow insertion of the insulative cylinder. The inside diameter of the insulative cylinder 30 is sized to permit the building bolt to be inserted into and through it.

It should be apparent to those skilled in the art that the present invention provides a means for preventing harmful electrical currents from flowing within the stator core when the inward edges of the stator core laminations are shorted. It should be further apparent that, although the preferred embodiment of the present invention has been described in considerable detail, it should not be considered to be so limited.

What we claim is:

1. A dynamoelectric machine, comprising:
    a stator member comprising a frame structure, a cylindrical stator core structure and at least one building bolt axially disposed along the outside surface of said stator core structure and generally parallel to the central axis of said cylindrical stator core structure, said stator core structure comprising a plurality of laminations;
    means for preventing electrical communication between said building bolt and a preselected number of said laminations, said preventing means comprising an insulative cylinder disposed about said building bolt proximate said preselected number of laminations;
    a first layer of plates disposed between said preselected number of laminations and the remainder of said stator core laminations, said first layer of plates being shaped to receive said insulative cylinder; and
    a second layer of plates disposed adjacent said preselected number of laminations on the opposite axial side of said preselected number of laminations from said first layer of plates, said preselected number of laminations being disposed between said first and second layers of plates, said second layer being shaped to receive said insulative cylinder, said first and second layers of plates being made of stainless steel and being thicker than said laminations.

2. A stator core overflux protection system, comprising:
    a stator core structure comprising at least one building bolt and a plurality of laminations arranged in a cylindrical shape with a central bore therethrough, said building bolt being disposed along the outside surface of said cylindrical shape and parallel to the central axis of said cylindrical shape, said plurality of laminations being divided into a first and a second group, said first group comprising a preselected number of contiguous laminations and said second group comprising all remaining laminations;
    an insulative cylinder disposed about said building bolt proximate said first group of laminations, said insulative cylinder preventing electrical communications between said building bolt and said first group of laminations;
    a first layer of plates disposed on a first axial side of said first group of laminations; and
    a second layer of plates disposed on a second axial side of said first group of laminations, said first and second layers of plates being made of stainless steel.

3. A stator core overflux protection system, comprising:
    a stator core structure comprising at least one building bolt and a plurality of laminations arranged in a cylindrical shape with a central bore therethrough, said building bolt being disposed along the outside surface of said cylindrical shape and parallel to the central axis of said cylindrical shape, said plurality of laminations being divided into a first and a second group, said first group comprising a preselected number of contiguous laminations and said second group comprising all remaining laminations;

an insulative cylinder disposed about said building bolt proximate said first group of laminations, said insulative cylinder preventing electrical communication between said building bolt and said first group of laminations;

a first layer of plates disposed on a first axial side of said first group of laminations; and a second layer of plates disposed on a second axial side of said first group of laminations, a preselected one of said first and second layers of plates being shaped to allow fluid flow therethrough.

* * * * *